United States Patent Office 3,414,557
Patented Dec. 3, 1968

3,414,557
MASTICATING POLYBUTADIENE TO
REDUCE COLD FLOW
Gerard Kraus, Bartlesville, Okla., and James J. Brennan, Jr., Scituate, Mass., assignors to Phillips Petroleum Company, a corporation of Delaware
No Drawing. Application June 22, 1962, Ser. No. 204,639, now Patent No. 3,238,187, dated Mar. 1, 1966, which is a continuation-in-part of applications Ser. No. 127,101, and Ser. No. 127,102, July 27, 1961. Divided and this application Aug. 30, 1965, Ser. No. 483,825
6 Claims. (Cl. 260—94.7)

This application is a divisional application of our copending application Ser. No. 204,639, filed June 22, 1962, now Patent Number 3,300,433 as a continuation-in-part of our then copending applications Ser. Nos. 127,101 and 127,102, both now abandoned, filed July 27, 1961.

This invention relates to a method of treating polybutadiene to improve its physical properties. In one aspect it relates to a method of reducing cold flow in polybutadiene. In another aspect it relates to a method of improving the processing characteristics of polybutadiene having at least about 75 percent cis-1,4 configuration.

In the manufacture and processing of elastomeric polybutadiene and particularly in packaging, shipping and storage, certain difficulties have been encountered because of the tendency of this polymer to cold flow in the unvulcanized state. For example, in the event that cracks or punctures develop in a package of the rubber, the polymer tends to flow therefrom leading to product loss or contamination or causing the packages to stick together.

Polybutadiene having a relatively high amount of cis-1,4 configuration is replacing large amounts of natural rubber, particularly in tread stock used for the manufacture of truck tires. This new type of synthetic rubber is superior in many respects to natural rubber and shows considerable improvement in the properties of heat build up and tack over the conventional butadiene/styrene emulsion copolymers. Cis-polybutadiene also exhibits many advantages over cis-polyisoprene which is the synthetic counterpart of natural rubber. In addition the existing capacity for production of 1,3-butadiene provides an obvious economic advantage for this polymer over the polymer based on isoprene.

Although cis-polybutadiene has many outstanding properties as pointed out above, it is frequently difficult to process. This is true in spite of the fact that the polymer which is produced commercially has a Mooney value less than 100, ordinarily in the range of 10 to 90 and more frequently less than 60. When cis-polybutadiene is compounded in conventional recipes and extruded, such as in manufacture of tire tread, the extrusion rates tend to be lower than ordinarily obtained with certain other commercial synthetic rubber such as SBR, and the edges of the extrudate are frequently rough. It is highly desirable, therefore, that a method be developed for improving the processing characteristics of cis-polybutadiene.

Milling or shearing of some high molecular weight polymers can cause chain scission leading to increased plasticity. It might appear, therefore, that severe milling or shearing of polybutadiene should be avoided since increasing the plasticity of the polymer could also be expected to increase the tendency of the polymer to cold flow, which, as pointed out above, is already too high. On the other hand, heating polybutadiene polymers is known to cause cross linking. While this might reduce the tendency of the polymer to cold flow it would be undesirable to produce cross linking in raw gum stock since this would make the polymer more difficultly processable and complicate compounding and fabricating operations.

We have discovered that, contrary to what might be expected, cold flow in polybutadiene can be substantially reduced without inducing cross linking by subjecting the polybutadiene to mastication for short periods at relatively high temperatures, for example, about 2 to 10 minutes and 240 to 460° F. Any type of polymer mixing apparatus can be used for this mastication, such as a differential roll mill, a Banbury mixer, or similar masticator.

We have found that prolonged mastication in the presence of oxygen breaks down the polymer to such a degree that cold flow is increased rather than decreased. This can be avoided, however, by limiting the oxygen available to the polymer being masticated, normally by controlling the available air. According to our invention cold flow of polybutadiene can be reduced by hot mastication as described above while limiting the available oxygen so that the inherent viscosity of the polymer does not decrease by more than 0.85. If oxygen is excluded altogether during mastication the cold flow of the polymer can be reduced without substantially changing its inherent viscosity. It is preferred that under such conditions the mixer be operated at a relatively high speed to produce a high shear rate and the desired reduction in cold flow of the polymer. Shear rate can be defined in terms of the maximum velocity gradient encountered within the mixing zone. In order to produce the desired reduction in cold flow when excluding oxygen it is preferred that this maximum velocity gradient should be at least 150 reciprocal seconds. "Velocity gradient" is defined later in detail. Our invention is especially valuable in reducing the cold flow of polybutadiene having at least about 40 percent cis-1,4 configuration and we prefer to practice the invention with polymers having cis contents of at least 75 percent, referred to hereinafter as "cis-polybutadiene."

We have further discovered that the processability of cis-polybutadiene can be improved by lowering its inherent viscosity with relatively severe masticating in the presence of oxygen. According to this aspect of our invention polybutadiene containing at least 75 percent cis-1,4 configuration is masticated in the presence of oxygen under high shear conditions in which the product will develop a temperature which at 3 minutes is at least about 275° F. This masticating is carried out in conventional rubber mixing apparatus and the requirements for high shear can be stipulated in terms of the maximum velocity gradient which is developed in the mixing zone. This velocity gradient should be at least 200 reciprocal seconds.

It is an object of our invention to provide a method of improving the physical properties of polybutadiene. It is another object of our invention to produce a method of reducing the cold flow of polybutadiene. Another object of our invention is to reduce the cold flow of cis-polybutadiene without substantially increasing the inherent viscosity of the polymer. Another object of our invention is to provide a method of improving the processability of cis-polybutadiene. Still another object is to provide a method of masticating cis-polybutadiene to provide a controlled reduction in its inherent viscosity. Other objects, advantages and features of our invention will be apparent to those skilled in the art from the following discussion.

The polymers to which this invention applies are homopolymers of butadiene which are rubbery or elastomeric in character. These polymers are preferably made in mass or solution polymerization processes using initiator systems comprising organometallic compounds and/or alkali metals. Emulsion systems also can be used. The microstructure of these polybutadienes in terms of cis-1,4 configuration can vary over a broad range, from less than 50 percent to 100 percent. We prefer to practice our invention with polybutadiene having a cis content of at least about 40 percent. Our invention has its greatest significance, however, in treating polymers containing at least 75 percent cis-1,4 configuration to reduce cold flow and/or improve processability. It should be said that the polymers with which we are most concerned are those polybutadienes having cis contents of at least 85 percent. Generally when the polybutadiene is produced as described below the cis content of the polymer will be in the range of about 90 to 100 percent.

The microstructure of the polymer can be determined by infrared analysis according to the procedure described in the examples. Although a number of different methods can be used to prepare butadiene polymers containing a high amount of cis-1,4 configuration, one suitable method involves the use of a catalyst composition which comprises a trialkylaluminum and titanium tetraiodide. Preparation of such a polymer is more fully described in the copending application of David R. Smith et al., Ser. No. 578,166, filed Apr. 16, 1956.

The trialkylaluminum in the catalyst system can contain the alkyl radicals containing 1 to 6 carbon atoms, for example, ethyl, propyl, isopropyl, n-butyl, n-hexyl and the like. Triethylaluminum and triisobutylaluminum have a high activity in the polymerization process. A ratio of about 1.5 to 10 mols of trialkylaluminum per mol titanium tetraiodide is suitable. Other catalyst systems, such as combinations of trialkylaluminum, titanium tetraiodide and titanium tetrachloride or trialkylaluminum, titanium tetrachloride and iodine, can be employed with good results.

The polymerization is ordinarily carried out at a temperature in the range of about −100 to +100° C., and although a hydrocarbon diluent can be used it is not necessary. A satisfactory catalyst concentration is in the range of 0.05 to 10 weight percent based on the 1,3-butadiene charged to the reactor. The reactor residence time can vary from a few seconds to as long as 24 hours or more and at the completion of the reaction the mixture is treated to inactivate the catalyst and precipitate the rubbery polymer, such as by adding an alcohol. The polymer is then separated from the alcohol and diluent, if diluent is used, by any suitable means such as decantation or filtration. The polymer thus produced is elastomeric and vulcanizable. Because a period of several days involving storage or transportation is ordinarily required between the production of the polymer and its use in a compounding recipe, the process of our invention is highly advantageous in reducing the cold flow of the polymer during this interval.

Polymers which are processed according to our invention to reduce the cold flow ordinarily have a Mooney value (ML-4 at 212° F.) in the range of about 10 to 90 and preferably the Mooney value is about 15 to 60. The polymer in its unvulcanized state is then masticated under conditions which will produce high shear within the polymer while oxygen is excluded from the mixing chamber or permitted to be present in limited supply. Any mixer which will produce high shear such as a Banbury mixer, extrusion drier, visco-elastic mill, Maxwell extruder, Gordon plasticator, Watson and Wilson masticator, differential roll mill or the like, can be used. Masticators of this type are well known in the rubber processing art.

Various methods can be employed to exclude oxygen. One suitable procedure is to operate in an inert atmosphere such as in nitrogen, argon, helium, neon or the like. A mixing chamber is first swept with the inert gas and a flow of gas is maintained through the chamber during the entire mixing period. An alternative method involves carrying out the mastication in an evacuated mixing chamber. Good results can also be obtained by operating in a closed chamber with sufficient polymer to substantially completely fill the space so that very little oxygen is present and the chamber is sealed so that no oxygen is admitted.

Oxygen in limited amount can be supplied to the polymer undergoing mastication in several ways. One convenient method is to fill an internal mixing chamber incompletely (for example about 75 to 98 percent full) so that air is trapped in the chamber with the polymer. In many instances normal leakage of air into the chamber will then maintain a limited supply of oxygen to the polymer. More control over the oxygen supply can be exercised by using an air tight mixing chamber having a vent which can be regulated and means for exhausting air from the chamber. With such equipment the air pressure within the mixing chamber can be varied from atmospheric to substantially a vacuum, e.g., 2 to 5 mm. Hg. For relatively short mixing periods the oxygen supply can be controlled by forcing air or other oxygen-containing gas through the mixing chamber at a constant rate. As the oxygen supply is increased up to saturation of the rubber the inherent viscosity of the polymer is decreased. A measurement of inherent viscosity, therefore, provides a simple method of determining the amount of oxygen available under a given air pressure of air flow rate, other conditions of mastication being equal.

In order to obtain a reduction of cold flow of the polymer being masticated the oxygen supply should be limited so that under the other conditions of time and temperature used the inherent viscosity of the polymer is reduced by an amount up to 0.85. In other words, the difference between the inherent viscosity of the masticated polymer and that of the original polymer before mastication should not be more than 0.85. For example, if the I.V. of the original unmasticated polymer is 2.78, the oxygen supply to the polymer being treated should be limited so that the I.V. of the masticated polymer is between 2.78 and 1.93. This, we have found, produces a product greatly improved in resistance to cold flow. In all cases the cold flow of a masticated polymer is less than the cold flow of a polymer with equivalent Mooney viscosity that has not been masticated.

The preferred method of operating to reduce cold flow is to conduct the mastication for 2 to 10 minutes at 240 to 460° F. with oxygen present in the mixing chamber under subamospheric pressure. We had found earlier that cold flow in the polymer was increased when the polymer was severely masticated in the presence of air, thereby causing a substantial breakdown of the polymer and reduction in inherent viscosity. We had also found that by excluding air from the mixing chamber the inherent viscosity of the polymer could be held substantially unchanged while effecting improvements in the resistance of the polymer to cold flow. It was quite surprising, therefore, to find that the greatest reductions in cold flow could be obtained with limited oxygen supply to the polymer so that a reduction in inherent viscosity also occurred. As shown by our data in the examples, our process using an air pressure in the range of about 0.05 to about 0.5 atmosphere was quite effective in reducing cold flow of the polybutadiene. It is advantageous to limit the oxygen supply in this manner while masticating the polymer for 3 to 6 minutes at a temperature in the range of 350 to 450° F.

The type of mastication which is desired to produce the best results in reduction of cold flow and/or inherent viscosity can be characterized in terms of the maximum shear rate occurring in the mixing apparatus used. This can be specified by the maximum velocity gradient encountered anywhere in the mixing chamber.

The maximum velocity gradient in a masticator is calculated by the formula:

$$V.G. = \frac{2\pi r f}{d}$$

where

V.G. is the maximum velocity gradient in reciprocal seconds $r$ is the radial distance from the axis of the rotor to the point of maximum shear $d$ is the distance between the stator and rotor at the point of maximum shear (same units as $r$)

$f$ is the revolutions per second of the rotor.

For a differential roll mill, $d$ is the nip of the rolls and $f$ is $f_1-f_2$ where $f_1$ and $f_2$ are the revolutions per second for the fast and slow roll, respectively. The point of maximum shear is that point in the mixer where the force acting to shear the polymer is greatest. Ordinarily this is at the periphery of the rotor, between the rotor and the wall of a Banbury mixer or at the nip of the rolls on a roll mill. The maximum velocity gradient can be readily determined by the above formula for any type of masticator commonly used in rubber processing under any operating conditions. As an example the maximum shear rates for a number of typical laboratory mixers are as follows:

| Instrument | $r$, in. | $d$, in. | R.p.m. | Velocity Gradient (reciprocal seconds) |
|---|---|---|---|---|
| Watson & Wilson Masticator | 0.983 | 0.118 [a] | 126 | 110 |
| | | | 215 | 188 |
| | | | 253 | 221 |
| | | | 320 | 282 |
| 2″ Rubber Mill | 1 | 0.002 | [b]2.23 | 117 |
| | | 0.010 | [b]2.23 | 24 |
| Midget Banbury | 1.19 | 0.055 | 60 | 136 |
| | | | 120 | 272 |
| | | | 180 | 408 |
| B-Banbury | 1.96 | 0.049 | 84 | 351 |

[a] For 10 gram charge.
[b] Δ (r.p.m.) at friction ratio 1.13.

In order to achieve reduction in cold flow of the polybutadiene when excluding oxygen the maximum velocity gradient in the mixing zone should be at least 150 reciprocal seconds and preferably is at least 200 reciprocal seconds. Only practical considerations such as reasonable speed of operating the equipment and power requirements place an upper limit on the maximum shear rate developed. Also the polymer will tend to heat because of the energy expended upon it and the shear rate should not be so great that excessive temperatures are developed and the polymer is degraded. As a practical matter the velocity gradient will not exceed 1,000 reciprocal seconds.

The mastication is continued long enough for a substantial amount of the polymer to be subjected to this maximum shear rate. Ordinarily, this is a relatively short time, e.g. at least 30 seconds and preferably at least a minute. The mastication can be continued up to 30 minutes or longer if oxygen is excluded, but little is to be gained in reducing cold flow of the polymer by masticating for more than 3 to 5 or 6 minutes. For most commercial equipment the period of mastication is preferably in the range of about 2 to 10 minutes.

As pointed out above, the polymer tends to heat because of the work done on it in mastication. The temperature developed in the polymer can be reduced by indirect heat exchange during mastication. It is frequently desirable, however, to use a heated jacket on the masticator so that initially the polymer is not so difficult to work. Usually the temperature rise in the polymer is quite rapid once mastication is begun and after reaching a peak begins to decline as the mastication is continued. Isothermal operation is possible but most impractical because of heat conduction problems. Ordinarily the polybutadiene reaches a temperature in the range of about 240 to 460° F., usually above 250° F. and preferably 300 to 450° F., during mastication.

When masticating cis-polybutadiene to improve processability by breakdown in the presence of oxygen the maximum velocity gradient encountered in the mixing zone should be at least 200 reciprocal seconds. The considerations for upper limit on shear rate are the same as given above for cold flow reduction in the absence of oxygen.

The mastication of the polymer to improve processability is continued for a long enough period for a substantial amount of the polymer to be subjected to the maximum shear rate which is developed in the mixing zone and for the polymer to obtain the minimum required temperature of 275° F. Ordinarily a mastication period of at least about 3 minutes is required and the minimum temperature is stipulated as that occurring in the product at the end of this 3-minute period, although the mastication can be continued for longer periods, for example, up to 30 minutes or more if desired. Ordinarily the inherent viscosity of the polymer continues to be reduced during the longer periods of mastication although the temperature of the polymer ordinarily declines from a maximum achieved initially. We have found, however, that unless the temperature of the polymer is at or above about 275° F. at the end of a 3-minute mastication period, a prolonged mastication produces very little further change in inherent viscosity. The masticating cycle can be varied to obtain accurate control of the inherent viscosity of the final product and in general the period depends upon the rate of shear employed in the mixing zone. Ordinarily the processing period is less than 20 minutes and preferably it is less than 10 minutes. Satisfactory results can be obtained with a 3- to 5-minute masticating cycle wherein the other conditions of the process are met. In reducing the inherent viscosity by this method it should be kept in mind that if the reduction is too severe there may be some sacrifice in the physical properties of the final product. This is an additional reason for maintaining the masticating cycle relatively short, that is, on the order of about 3 to 10 and preferably 3 to 5 minutes.

When operating to improve processability of cis-polybutadiene, the temperature developed in the polymer must be at least about 275° F. and preferably 290° F. or above for a substantial period during mastication as indicated by the temperature of the polymer at the end of the first 3 minutes. During the mastication the temperature of the polymer can be controlled somewhat by indirect heat exchange, using a jacket on the masticating chamber. The temperature in the jacket, however, should not be so low that the polymer is prevented from obtaining the minimum temperature stipulated. Usually the temperature rise in the polymer is quite rapid once mastication is begun and after it reaches a peak, ordinarily in about 1 to 2 minutes, the temperature begins to decline as the mastication is continued. The polymer must be masticated at a temperature in the required range for at least about 1 or 2 minutes. This condition is fulfilled when the product temperature after 3 minutes of mastication is still above 275° F. As is evident from the data of the examples, the best results are obtained when the polymer is at a temperature of about 340 to 360° F. at the end of a 3-minute mastication period.

In addition to the above requirement of minimum velocity gradient and minimum product temperature, mastication must be carried out in an atmosphere of oxygen or oxygen-containing gas, such as air, to obtain a reduction in inherent viscosity. Preferably a flow of air or oxygen is maintained through the mixing chamber during the entire mixing period. The flow rate of the oxygen-containing gas can vary considerably and a flow-rate of air of only about 1 cubic foot per hour per 100 grams of polymer is satisfactory. It should be understood that much higher rates can be employed, for example, up to 50 cubic feet per hour per 100 grams of polymer or more. Very little difference in inherent viscosity is obtained by further increasing the flow rate of air provided the other conditions of the process are met.

The polymers with which we prefer to operate are polybutadienes which contain at least 85 percent cis-1,4 configuration and have a Mooney value in the range of about 15 to 60 and more preferably in the range of about 30 to 60 (ML-4 at 212° F.). The processing problems which are overcome by the method of this invention are apparently unique to these high cis polymers of butadiene, which are normally produced with inherent viscosities between 2.3 and 3.0. For the best in processability the inherent viscosity of the polymers should be reduced to a range of about 1.6 to 2.3 and we prefer to modify the polymers to an inherent viscosity of about 1.9 to 2.1.

Even though the inherent viscosity of the polymer as produced from the polymerization process is considerably above this range, the processing method of this invention permits the controlled reduction of its inherent viscosity to a desirable level for a good processability.

After treating the polymer as described above it can be packaged and stored or transferred for processing elsewhere. The subsequent blending, compounding, fabrication and curing operations can be conducted according to conventional procedures, and the treatment according to this invention to reduce cold flow does not decrease the processability of the polymer.

To illustrate further the advantages of our invention the following examples are presented. In these examples the conditions and proportions are typical only and should not be construed to limit the invention unduly.

Example I

Samples of three polybutadienes having different Mooney values were subjected to shear in an atmosphere of nitrogen in a laboratory masticator (Watson and Wilson masticator manufactured by George Wailes and Company, Ltd.). The mixing chamber was first swept with prepurified nitrogen and a flow of nitrogen was maintained through it for the duration of each run. Inherent viscosity and cold flow were measured on each sample before and after shearing. Cold flow was measured by extruding the rubber through a ¼-inch orifice at 3.5 p.s.i. pressure and a temperature of 50° C. (122° F.). After allowing 10 minutes to reach steady state, the rate of extrusion was measured and the values reported in milligrams/minute. All polymers were gel free before and after shearing.

The microstructures of these polybutadienes which are identified as Polymers A, B and C were as follows:

|  | cis, percent | trans, percent | Vinyl, percent |
|---|---|---|---|
| Polymer A | 92.8 | 4.2 | 3.0 |
| Polymer B | 94.9 | 1.9 | 3.2 |
| Polymer C | 95.7 | 1.7 | 2.6 |

In all three runs the masticator was operated at a speed of 253 r.p.m. which provided a maximum velocity gradient of 221 reciprocal seconds. The jacket temperature was 194° F., and the polymers were each masticated for 15 minutes. A summary of the runs appears in Table I.

TABLE I

| Polymer | Original Mooney [1] | Cold Flow [2] | | Inherent Viscosity | |
|---|---|---|---|---|---|
| | | Before | After | Before | After |
| A | 17 | 13.5 | 6.3 | 1.64 | 1.70 |
| B | 30 | 9.1 | 0.6 | 2.06 | 2.27 |
| C | 46 | 2.9 | 0.6 | 2.61 | 2.58 |

[1] ML-4 at 212° F.
[2] Milligrams per minute (determined as described above).

The above data show that cis-polybutadiene of various Mooney values can be decreased in cold flow by the process of this invention without materially affecting the inherent viscosity of the polymer.

The microstructures of polymers A and B were determined by infrared analysis using the method of Silas, Yates and Thornton, "Analytical Chemistry," 31, 529 (1959).

Examples II

In a series of runs using samples of polymer C of Example I, the polymer was masticated as described in Example I in an atmosphere of prepurified nitrogen for a mixing time of three minutes while varying masticator speed and jacket temperature. All samples were gel free before and after shearing. The results are reported in Table II.

TABLE II

| Run No. | Masticator Speed, r.p.m. | Velocity Gradient [1] | Jacket Temp., ° F. | Dump Temp., ° F. | Inherent Viscosity | Cold Flow [2] |
|---|---|---|---|---|---|---|
| Initial | | | | | 2.90 | 2.6 |
| 1 | 253 | 221 | 194 | 290 | 2.70 | 1.1 |
| 2 | 253 | 221 | 140 | 245 | 2.49 | 1.5 |
| 3 | 126 | 110 | 194 | 265 | 2.73 | 2.6 |

[1] Maximum in masticator, Sec⁻¹.
[2] Milligrams per minute.

The above data show that the higher shearing rates are required for reduction of cold flow. Run 3 with a velocity gradient of 110 reciprocal seconds exhibited no improvement in this respect. Run 2 with a velocity gradient of 221 reciprocal seconds, a lower jacket temperature and a lower dump temperature resulted in improved cold flow although better results were obtained when the dump temperature of the polymer was higher as shown in Run 1.

Samples of polymer C were masticated in a series of runs employing the conditions of Run 1 for longer periods of time. The results of these runs, 4–6, compared to the control and Run 1 are shown in Table III.

TABLE III

| Run No. | Dump Temp., ° F. | Mixing Time (min.) | Inherent Viscosity | Cold Flow [1] |
|---|---|---|---|---|
| Initial | | 0 | 2.90 | 2.6 |
| 1 | 290 | 3 | 2.70 | 1.1 |
| 4 | 275 | 5 | 2.36 | 1.0 |
| 5 | 260 | 10 | 2.50 | 1.2 |
| 6 | 255 | 30 | 2.34 | 1.1 |

[1] Milligrams per minute.

As demonstrated above, substantially all of the improvement in reducing cold flow was obtained after three minutes mixing time and mixing for longer periods produced little or no change from this result.

Example III

To demonstrate the importance of excluding oxygen from the mixing chamber, samples of polymer C were subjected to mastication while circulating air through the masticator at a rate of 1 cubic foot per hour per 10 grams of rubber. The operating conditions were otherwise as shown for Run 1 in Example II except that the mixing time was also varied as in Runs 4–6. The results are shown in Table IV.

TABLE IV

| Run No. | Dump Temp., ° F. | Mixing Time (min.) | Inherent Viscosity | Cold Flow [1] |
|---|---|---|---|---|
| Initial | | 0 | 2.90 | 2.6 |
| 7 | 323 | 3 | 2.18 | 1.2 |
| 8 | 310 | 5 | 2.04 | 4.0 |
| 9 | 275 | 10 | 1.53 | 5.1 |
| 10 | 235 | 30 | 1.32 | 4.7 |

[1] Milligrams per minute.

The above data show that pronounced breakdown in the polymer resulted when the shearing was effected in the presence of air as evidenced by the decrease in inherent viscosity. Furthermore, as the mastication continued with further decrease in inherent viscosity, the cold flow of the polymer was greatly increased rather than decreased.

Example IV

A comparison of the effects of static heating and mastication according to the invention is presented in the following data. A gel free polymer having a Mooney value (ML-4 at 212° F.) of 42, an inherent viscosity of 2.49, a cis content of 95.5 percent, trans content of 1.6 percent and vinyl content of 2.9 percent was subjected to static heating at 307° F. for three and five minutes. Other specimens of this polymer were masticated in the Watson and Wilson masticator used in Example I for three and five minutes while excluding oxygen. The rotor speed of the masticator was 320 r.p.m. providing a maximum velocity gradient of 282 reciprocal seconds. The jacket temperature was 194° F. The results are shown in Table V.

TABLE V

| Time (min.) | Static Heating Cold Flow [1] | Mixing | |
|---|---|---|---|
| | | Cold Flow [1] | Dump Temp. °F. |
| 0 | 4.4 | 4.4 | |
| 3 | 3.9 | 0.51 | 305 |
| 5 | 3.5 | 0.47 | 290 |

[1] Milligrams per minute.

The above data show that although there was some reduction in cold flow as a result of heating alone, an improvement of an entirely different order of magnitude was obtained by mastication at high shear rate. Since butadiene polymers undergo thermal vulcanization to some extent at elevated temperatures, the demonstrated slight reduction in cold flow resulting from static heating alone would be expected. It is demonstrated, however, that the improvements obtained by the method of the invention are the result of the severe mastication with the exclusion of oxygen and not merely the result of the elevated temperature developed within the polymer being worked.

Example V

Butadiene was polymerized in the presence of an initiator comprising triisobutylaluminum, titanium tetrachloride, and iodine to give a product which had the following properties:

Mooney value (ML–4 at 212° F.) _____ 40.5
Inherent viscosity _____ 2.48
Gel, percent _____ 0
Microstructure, percent:
 Cis _____ 95.5
 Trans _____ 1.6
 Vinyl _____ 2.9

Samples of the polymer were masticated in the presence of air in a hot B Banbury for periods of 1, 2, 3, and 4 minutes. Banbury jacket temperature was 350° F. and dump temperature for the raw polymer varied from 305° F. for one minute mixing to 425° F. for 4 minutes mixing. The Banbury was filled to 95.6 percent of capacity with rubber. Banbury capacity, 1150 cc.; rubber charged, 1000 grams or 1099 cc. (density of rubber, 0.91).

Mooney values, gel, and cold flow data were obtained on the uncompounded polymer samples. Results are summarized in the following table.

TABLE VI

| | Polymer | | | | |
|---|---|---|---|---|---|
| | A | B | C | D | E |
| Minutes mix in 350° F. Banbury | 0 | 1 | 2 | 3 | 4 |
| Dump temperature, °F | | 305 | 360 | 410 | 425 |
| ML–4 at 212° F | 40.5 | 40.0 | 36.5 | 38.5 | 38.5 |
| Inherent viscosity | 2.48 | 2.45 | 2.34 | 2.25 | 2.36 |
| Gel, percent | 0 | 0 | 0 | 0 | 0 |
| Cold Flow, mg./min | 3.85 | 3.31 | 2.79 | 1.92 | 1.26 |

The data show that mixing the raw polymer for short periods at high temperatures with air present reduces cold flow without introducing gel. There were no significant changes in physical properties of the polymer after compounding in a conventional recipe and curing.

Example VI

A cis-polybutadiene prepared in the presence of an initiator of triisobutylaluminum, titanium tetrachloride, and iodine and having a cold flow of 5.7 mg./minute, an inherent viscosity of 2.54, 0 gel and a Mooney value (ML–4 at 212° F.) of 46.5 was masticated in a Brabender plastograph using the conditions shown in the following tables.

| R.p.m. | Maximum Velocity Gradient (reciprocal seconds) | Jacket Temperature (° F.) |
|---|---|---|
| Run 1 _____ 100 | 190 | 212 |
| Run 2 _____ 100 | 190 | 284 |
| Run 3 _____ 150 | 270 | 284 |

TABLE VII

| Sample | Time, Min. | Atm. of Air | Cold Flow, mg./min. | Dump Temp., °F. | Inherent Viscosity |
|---|---|---|---|---|---|
| Run 1: | | | | | |
| A | 1 | vac. | 5.7 | 273 | |
| B | 1 | 0.05 | 6.0 | 277 | |
| C | 1 | 0.1 | 4.7 | 268 | |
| D | 1 | 0.3 | 5.6 | 271 | |
| E | 1 | 1 | 6.2 | 257 | |
| F | 3 | vac. | 5.3 | 307 | |
| G | 3 | 0.05 | 4.7 | 302 | |
| H | 3 | 0.1 | 4.5 | 300 | |
| I | 3 | 0.3 | 5.0 | 295 | |
| J | 3 | 1 | 4.8 | 291 | |
| K | 6 | vac. | 5.8 | 313 | |
| L | 6 | 0.05 | 4.2 | 331 | |
| M | 6 | 0.1 | 3.9 | 334 | |
| N | 6 | 0.3 | 2.4 | 333 | |
| P | 6 | 1 | 3.6 | 311 | |
| Run 2: | | | | | |
| A | 1 | vac. | 7.0 | 315 | |
| B | 1 | 0.05 | 6.3 | 309 | |
| C | 1 | 0.1 | 6.6 | 309 | |
| D | 1 | 0.3 | 4.9 | 306 | |
| E | 1 | 1 | 4.8 | 302 | |
| F | 3 | vac. | 4.2 | 349 | 2.57 |
| G | 3 | 0.05 | 3.6 | 351 | |
| H | 3 | 0.1 | 3.7 | 347 | 2.51 |
| I | 3 | 0.3 | 2.7 | 347 | |
| J | 3 | 1 | 3.1 | 340 | 2.30 |
| K | 6 | vac. | 2.4 | 367 | 2.59 |
| L | 6 | 0.05 | 1.9 | 369 | |
| M | 6 | 0.1 | 1.4 | 367 | 2.43 |
| N | 6 | 0.3 | 1.5 | 360 | |
| O | 6 | 1 | 2.3 | 349 | 1.97 |
| Run 3: | | | | | |
| A | 1 | vac. | 4.7 | 329 | |
| B | 1 | 0.05 | 6.3 | 333 | |
| C | 1 | 0.1 | 5.8 | 331 | |
| D | 1 | 0.3 | 5.4 | 331 | |
| E | 1 | 1 | 4.6 | 325 | |
| F | 3 | vac. | 2.2 | 387 | 2.58 |
| G | 3 | 0.05 | 1.9 | 383 | |
| H | 3 | 0.1 | 1.4 | 390 | 2.52 |
| I | 3 | 0.3 | 1.6 | 383 | |
| J | 3 | 1 | 1.1 | 374 | 2.07 |
| K | 6 | vac. | 0.3 | 419 | 2.65 |
| L | 6 | 0.05 | 0.1 | 417 | |
| M | 6 | 0.1 | 0 | 417 | 2.44 |
| N | 6 | 0.3 | 0.9 | 403 | |
| O | 6 | 1 | 1.3 | 378 | 1.72 |

Blends of samples L and M and of H and I of Run 3 when compounded and cured exhibited excellent physical properties. The above data demonstrate the advantages of admitting air to the polymer in limited supply, particularly at subatmospheric pressure. Reasonably high reductions in inherent viscosity can be obtained in this manner while still obtaining improvements in resistance to cold flow.

Example VII

Polybutadiene prepared using n-butyllithium as the initiator was masticated to reduce its tendency to cold flow. The original polymer had 31.5 Mooney value (ML–4 at 212° F.), 2.00 inherent viscosity, 0 gel, 42.1 percent cis, 49.5 percent trans, 8.5 percent vinyl, and had a cold flow of 15.7 mg./minute. This polymer was masticated in the Brabender Plastograph under vacuum and 1 atmosphere of air, respectively, for six minutes, 150 r.p.m. mixing speed, maximum velocity gradient of 270 sec.$^{-1}$, and 149° F. jacket temperature. The following data were obtained.

TABLE VIII

|  | Vacuum | Air |
|---|---|---|
| Maximum Temperature, °F | 354 | 304 |
| Cold flow, mg./min | 4.5 | 7.6 |
| Inherent Viscosity | 2.00 | 1.56 |
| Gel, percent | 0 | 0 |

Mastication of this polymer in substantial absence of air reduced cold flow, while inherent viscosity remained fixed; in air breakdown along with reduction in cold flow was realized.

Example VIII

Sevarel samples of cis-polybutadiene were subjected to shear in an atmosphere of air in a laboratory masticator (Watson and Wilson masticator manufactured by George Wailes and Co., Ltd.). The polybutadiene had been prepared by polymerizing polybutadiene in the presence of a triisobutylaluminum-titanium tetrachloride-titanium tetraiodide initiator to give a product having a Mooney value (ML-4 at 212° F.) of 49, an inherent viscosity of 2.5, a cis-content of 95.7 percent, trans content of 1.7 percent, and vinyl content of 2.6 percent. The masticator speed was varied to provide the velocity gradients indicated in the tables, the correlation between operating speed and maximum velocity gradient being that previously given for this type of masticator. The air flow rate, jacket temperature and mixing times were also varied. Ten gram samples were used and the air flow rates given are in terms of cubic feet per hour per 10 grams of polymer. The inherent viscosity was determined on each of the samples. The results using air flow rates of 1, 2 and 4 cubic feet per hour per 10 grams of polymer are shown in Tables IX, X and XI, respectively. The average results of all of the runs are given in Table XII. While the results obtained with 3 minute mastication of Run 11 and the 5 minute mastication of Run 17 are anomalous, the overall trend of the data is quite pronounced and demonstrates quite clearly that the conditions stipulated for the practice of this invention are critical. All of the samples remained gel-free after mastication.

In Tables IX-XII the results are given in terms of the amount of decrease in inherent viscosity from the initial value of 2.5 for the polymer. Inherent viscosities were determined in every case but unless there was a decrease in inherent viscosity, numerical data are not given. The dashes indicate that either there was no decrease or else there was an increase in inherent viscosity at the end of the mastication period.

TABLE IX

Air Flow—1 cubic foot per hour.
Jacket Temp.—Runs 1, 2 and 5: 194° F.; Runs 3, 4 and 6: 140° F.

| Run No. | Velocity Gradient [1] | 3 Min. Dump Temperature, °F. | Decrease in Inherent Viscosity after— | | | |
|---|---|---|---|---|---|---|
| | | | 3 min. | 5 min. | 10 min. | 30 min. |
| 1 | 282 | 355 | 0.42 | 0.72 | 1.01 | 1.32 |
| 2 | 221 | 320 | 0.32 | 0.46 | 0.97 | 1.18 |
| 3 | 282 | 280 | 0.37 | 0.35 | 0.26 | 0.45 |
| 4 | 221 | 255 | [2]— | 0.15 | 0.05 | 0.10 |
| 5 | 110 | 255 | — | — | — | 0.22 |
| 6 | 110 | 195 | — | — | — | 0.03 |

[1] Reciprocal seconds.
[2] A dash (—) indicates no decrease in inherent viscosity, e.g. no change an increase.

TABLE X

Air flow—2 cubic feet per hour.
Jacket Temp.—Runs 7, 8 and 11: 194° F.; Runs 9, 10 and 12: 140° F.

| Run No. | Velocity Gradient [1] | 3 Min. Dump Temperature, °F. | Decrease in Inherent Viscosity after— | | | |
|---|---|---|---|---|---|---|
| | | | 3 min. | 5 min. | 10 min. | 30 min. |
| 7 | 282 | 345 | 0.31 | 0.94 | 1.11 | 1.26 |
| 8 | 221 | 315 | 0.11 | 0.36 | 0.40 | 1.05 |
| 9 | 282 | 275 | 0.30 | 0.16 | 0.82 | 0.48 |
| 10 | 221 | 260 | 0.06 | 0.10 | 0.09 | 0.12 |
| 11 | 110 | 250 | 0.41 | 0.05 | 0.08 | 0.04 |
| 12 | 110 | 200 | 0.03 | [2]— | — | — |

[1] Reciprocal seconds.
[2] A dash (—) indicates no decrease in inherent viscosity, e.g. no change or an increase.

TABLE XI

Air Flow—4 cubic feet per hour.
Jacket Temp.—Runs 13, 14 and 17: 194° F.; Runs 15, 16 and 18: 140° F.

| Run No. | Velocity Gradient [1] | 3 Min. Dump Temperature, °F. | Decrease in Inherent Viscosity after— | | | |
|---|---|---|---|---|---|---|
| | | | 3 min. | 5 min. | 10 min. | 30 min. |
| 13 | 282 | 355 | 0.22 | 0.71 | 0.94 | 1.23 |
| 14 | 221 | 310 | 0.38 | 0.53 | 0.33 | 0.59 |
| 15 | 282 | 290 | 0.36 | 0.37 | 0.39 | 0.52 |
| 16 | 221 | 250 | 0.08 | 0.04 | 0.10 | 0.17 |
| 17 | 110 | 255 | 0.11 | 0.30 | [2]— | 0.28 |
| 18 | 110 | 190 | 0.09 | — | — | 0.05 |

[1] Same as Table IX.
[2] Same as Table IX.

TABLE XII

[Average of Runs 1–18]

| 3 Minute Dump Temperature, °F. | Decrease in Inherent Viscosity after— | | | |
|---|---|---|---|---|
| | 3 Min. | 5 Min. | 10 Min. | 30 Min. |
| 352 | 0.32 | 0.79 | 1.03 | 1.27 |
| 315 | 0.27 | 0.45 | 0.57 | 0.94 |
| 282 | 0.34 | 0.29 | 0.49 | 0.48 |
| 255 | 0.05 | 0.10 | 0.08 | 0.13 |
| 253 | 0.08 | 0.10 | [1]— | 0.18 |
| 195 | 0.01 | — | — | 0.02 |

[1] Same as Table IX, footnote 2.

The above data demonstrate that increasing the air flow rate over 1 cubic foot per hour per 10 grams of polymer during mastication has very little effect upon the results obtained. The data also show that the desired reduction in inherent viscosity is not obtained unless conditions of shear are such that a maximum velocity gradient of at least 200 reciprocal seconds is produced in the mixing chamber and the temperature of at least 275° F. is obtained in the polymer at the end of a 3 minute masticating period. When these conditions are satisfied the mixing cycles should be kept short in order that the inherent viscosity is not reduced below the desired level. A masticating period of less than 10 minutes ordinarily gives the desired reduction in inherent viscosity provided that the shear rate and product temperature are high enough during mastication.

Example IX

The polymer employed in Example VIII was masticated in two runs at different velocity gradients employing an inert atmosphere of nitrogen, and the results are shown in Table XIII.

TABLE XIII

Nitrogen Flow—1 cubic foot per hours.
Jacket Temperature—194° F.

| Run No. | Velocity Gradient [1] | 3 Min. Dump Temperature, °F. | Decrease in Inherent Viscosity after— | | | |
|---|---|---|---|---|---|---|
| | | | 3 min. | 5 min. | 10 min. | 30 min. |
| 19 | 282 | 310 | [2]— | — | — | — |
| 20 | 221 | 290 | — | 0.14 | — | 0.16 |

[1] Same as Table IX.
[2] Same as Table IX.

The above data show quite clearly that reduction in inherent viscosity is not obtained if mastication is carried out in the absence of oxygen.

Example X

Polybutadiene was prepared by polymerizing butadiene in the presence of a triisobutylaluminum-titanium tetrachloride-titanium tetraiodide initiator to give a gel-free product having a Mooney value (ML–4 at 212° F.) of 45, an inherent viscosity of 2.48, a cis content of 95.3 percent, trans content of 1.8 percent, and vinyl content of 2.9 percent. The polymer was masticated in a Midget Banbury for 10 minutes at a speed of 155 r.p.m. (velocity gradient of 352 reciprocal seconds). The amount of sample was 225 grams. Air flow rate through the Banbury was 5 cubic feet/hour, the jacket temperature was 190° F., and the dump temperature was 320° F. After mastication the Mooney value was 22.2 and the inherent viscosity was 1.80.

The polymer was compounded, cured and physical properties determined. Following are the data:

Compounding recipe, parts by weight:

| | |
|---|---|
| Cis-polybutadiene | 100 |
| High abrasion furnace black | 50 |
| Zinc oxide | 3 |
| Stearic acid | 1 |
| Flexamine[1] | 1 |
| Resin 731[2] | 5 |
| Philrich 5[3] | 5 |
| Sulfur | 1.75 |
| Santocure[4] | 1.1 |

Physical properties, cured 30 min. at 307° F.:

| | |
|---|---|
| $\gamma \times 10^4$, moles/cc. | 2.04 |
| 300% Modulus, p.s.i. | 1370 |
| Tensile, p.s.i. | 2910 |
| Elongation, percent | 530 |
| Shore A Hardness | 62 |
| $\Delta T$, ° F. | 50 |
| Resilience, percent | 76.1 |

[1] Physical mixture containing 65 percent of a complex diarylamine-ketone reaction product and 35 percent of N,N'-diphenyl-p-phenylene-diamine.
[2] Disproportionated pale rosin stable to heat and light.
[3] Aromatic oil.
[4] N-cyclohexyl-2-benzothiazolsulfenamide.

The data show that a rubber with good properties was obtained.

Values for Mooney viscosity, inherent viscosity and cis, trans, and vinyl content given in the above examples unless otherwise indicated were obtained by the following procedures:

Mooney (ML–4 at 212° F.) was determined by the method ASTM D–927–57T.

Inherent viscosity was determined by placing 0.1 gram of polymer in a wire cage in 100 milliliters of toluene and allowing the polymer to stand at room temperature (about 25° C.) for 24 hours. The cage was then removed and the solution filtered through a sulfur absorption tube of grade C porosity to remove solid particles. The solution was then passed through a Medalia-type viscometer at 25° C., the viscometer having been calibrated with toluene. The inherent viscosity is calculated by dividing the natural logarithm of the relative viscosity by the weight of the original sample. The relative viscosity is the ratio of the viscosity of the polymer solution to that of toluene.

The microstructures of the polymers were determined by dissolving a sample of the polymer in carbon disulfide to form a solution of 25 grams of polymer per liter of solution. Using a commercial infrared spectrometer the infrared spectrum of the solution (percent transmission) was then determined.

The percent of the total unsaturation present as trans 1,4- was calculated according to the following equation and consistent units:

$\epsilon = E/tc$, where $\epsilon$ = extinction coefficient (liters-mols$^{-1}$-centimeters$^{-1}$);

$E$ = extinction (log $I_0/I$); $t$ = path length (centimeters); and $c$ = concentration (mols double bond/liter). The extinction was determined at the 10.35 micron band and the extinction coefficient was 146 (liters-mols$^{-1}$-centimeters$^{-1}$).

The percent of the total unsaturation present as 1,2- (or vinyl) was calculated according to the above equation, using the 11.0 micron band and an extinction coefficient of 209 (liters-mols$^{-1}$-centimenters$^{-1}$).

The percent of the total unsaturation present as cis 1,4- was obtained by subtracting the trans 1,4- and 1,2- (vinyl) determined according to the above procedure from the theoretical unsaturation, assuming one double bond per each $C_4$ unit in the polymer.

As will be apparent to those skilled in the art, various modifications can be made in our invention without departing from the spirit or scope thereof.

We claim:

1. A method of reducing cold flow in unvulcanized polybutadiene containing at least 40 percent cis -1,4 configuration which comprises masticating said polybutadiene for at least 0.5 minute under high shear conditions in which the maximum velocity gradient is at least 150 reciprocal seconds while excluding oxygen from said polybutadiene, said polybutadiene reaching a temperature of about 240 to 460° F.

2. The method of claim 1 wherein oxygen is excluded from said chamber by maintaining therein an atmosphere of inert gas.

3. The method of claim 1 wherein gas is evacuated from said chamber during said mastication.

4. The method of claim 1 wherein said mastication is carried out for 1 to 10 minutes and said polybutadiene reaches a temperature of above 250° F.

5. A method of reducing cold flow in unvulcanized polybutadiene containing at least 75 percent cis 1,4 configuration and having a Mooney value, ML–4 at 212° F., in the range of 10 to 90 which comprises masticating said polybutadiene for at least 0.5 minute while excluding oxygen therefrom, said mastication being carried out under high shear conditions in which the maximum velocity gradient is at least 200 reciprocal seconds and said polybutadiene reaches a temperature of about 240 to 460° F.

6. A method of reducing cold flow in unvulcanized cis-polybutadiene having a Mooney value (ML/4 at 212° F.) of 15 to 60 and containing at least 85 percent cis-1,4 configuration which comprises masticating said polybutadiene for at least 1 minute under conditions of high shear in a mixing chamber while excluding oxygen from said chamber, the maximum velocity gradient developed in said chamber being at least 200 reciprocal seconds and said polybutadiene reaching a temperature of about 240 to 460° F., and thereafter removing said polybutadiene from said chamber.

References Cited

UNITED STATES PATENTS 3,324,100  6/1967  Kraus _____ 260—94.7

FOREIGN PATENTS 281,279  10/1946  Great Britain.
1,019,700  2/1966  Great Britain.

OTHER REFERENCES

Pike et al.: "Mastication of Rubber," Journal of Polymer Science, vol. IX, No. 3, Sept. 26, 1952, p. 229–251.

JOSEPH L. SCHOFER, *Primary Examiner.*

W. F. HAMROCK, *Assistant Examiner.*